United States Patent
Lee

(10) Patent No.: US 10,271,412 B2
(45) Date of Patent: Apr. 23, 2019

(54) CASE OF PERSONAL TERMINAL DEVICE WITH ELECTRIC SHOCKING FUNCTION AND FINGER SCAN

(71) Applicant: Hwajung Lee, Busan (KR)

(72) Inventor: Hwajung Lee, Busan (KR)

( * ) Notice: Subject to any disclaimer, the term of this patent is extended or adjusted under 35 U.S.C. 154(b) by 90 days.

(21) Appl. No.: 14/695,648

(22) Filed: Apr. 24, 2015

(65) Prior Publication Data

US 2016/0120011 A1    Apr. 28, 2016

(30) Foreign Application Priority Data

Oct. 23, 2014  (KR) .................. 10-2014-0144091

(51) Int. Cl.
| | |
|---|---|
| *H04M 1/18* | (2006.01) |
| *H04M 1/21* | (2006.01) |
| *H05C 1/06* | (2006.01) |
| *H04M 1/725* | (2006.01) |
| *H04B 1/3888* | (2015.01) |

(52) U.S. Cl.
CPC ............. *H05C 1/06* (2013.01); *H04B 1/3888* (2013.01); *H04M 1/21* (2013.01); *H04M 1/185* (2013.01); *H04M 1/72538* (2013.01)

(58) Field of Classification Search
CPC .. H04W 4/22; H04W 76/007; H04M 2242/04
USPC .......................................... 455/575.1, 404.1
See application file for complete search history.

(56) References Cited

U.S. PATENT DOCUMENTS

| | | | | |
|---|---|---|---|---|
| 6,091,597 A | * | 7/2000 | Lin .................... | F41B 15/04 361/115 |
| 2010/0078343 A1 | * | 4/2010 | Hoellwarth ....... | B29C 45/14639 206/320 |
| 2010/0231776 A1 | * | 9/2010 | Li ...................... | F41H 13/0018 348/333.01 |
| 2011/0290676 A1 | * | 12/2011 | Kershenstein ......... | A45C 11/00 206/37 |
| 2013/0107435 A1 | * | 5/2013 | Wu .................... | H05K 5/00 361/679.01 |
| 2013/0244724 A1 | * | 9/2013 | Monti ................. | H04M 11/04 455/556.1 |

(Continued)

FOREIGN PATENT DOCUMENTS

WO     WO 02095320 A1 * 11/2002  ............... H05C 1/00

*Primary Examiner* — Yuwen Pan
*Assistant Examiner* — Fatuma G Sherif
(74) *Attorney, Agent, or Firm* — Muncy, Geissler, Olds & Lowe, P.C.

(57) ABSTRACT

A case of personal terminal device with electric shocking function and finger scan is disclosed, which including the shock unit mounted so that it can be accommodated and projected on one side of the case body accommodating the portable terminal and generate high current by amplifying electric energy supplied from the power supply unit mounted on the case body, the control unit that operates the shock unit in case of emergency, the multimedia unit mounted on one side of the case body to directly collect or control the control unit to collect the operating conditions of the shock unit in sound or image by using the microphone or camera built in the portable terminal, and the communication unit transmitting the current position of the portable terminal to specific organizations along with sound or image collected in the multimedia unit during the operation of the shock unit.

6 Claims, 2 Drawing Sheets

(56) References Cited

U.S. PATENT DOCUMENTS

2013/0281003 A1\* 10/2013 Newcomer ............. F24F 13/06
454/284

\* cited by examiner

CASE OF PERSONAL TERMINAL DEVICE WITH ELECTRIC SHOCKING FUNCTION AND FINGER SCAN

CROSS-REFERENCE TO RELATED APPLICATION

This application claims priority from Korean Patent Application No. 10-2014-0144091, filed on Oct. 23, 2014, in the Korean Intellectual Property Office, the content of which are hereby incorporated by reference in their entirety for all purposes.

BACKGROUND OF THE INVENTION

Technical Field

The present invention relates to a case of personal terminal device with electric shocking function and finger scan, more specifically protecting and defending the holder of the portable terminal device against threats in case of emergency, as well as performing the original function of the case to protect the portable terminal from an external shock.

Background Art

Although the necessity of stun gun as a self-defense gadget is increasing among the socially disadvantaged as well as women for a safer social life, they are still reluctant to carry stun guns despite the recognition of their necessity.

This can be understood from the fact that the incidence of crime is generally very rare, and on the contrary it is inconvenient to carry the stun gun due to its large volume.

In addition, even when the holder normally carries the stun gun for self-defense, its effectiveness for self-defense may be halved if the holder is not always aware of the location of the stun gun and not prepared to immediately respond to unexpected occurrence of a crime.

Therefore, there is an urgent need to develop a device to increase the portability of stun gun and to allow an instant response in case of crime.

SUMMARY OF THE INVENTION

Technical Problem

The present invention aims to improve the above problems, and is intended to provide the case of personal terminal device with electric shocking function and finger scan that can actively protect and defend the holder of portable terminal against threats in case of emergency as well as perform the original function of the case to protect the portable terminal from external shocks.

Solution to Problem

In order to accomplish the aforesaid objects, the present invention provides the case of personal terminal device with electric shocking function and finger scan that is characterized in that it comprises: the case body to accommodate the body of the portable terminal; the shock unit to be mounted on one side of the case body so as to be so stored and projected, generating high current by amplifying the electric energy supplied from the power supply unit mounted in the aforesaid case body; the control unit to be electrically connected to the aforesaid shock unit, power supply unit, and portable terminal, operating the aforesaid shock unit during emergencies; multimedia unit to be mounted on one side of the aforesaid case body, directly collecting the operating situation of the aforesaid shock unit in sound or image, or controlling the collection in sound or image of the operating situation of the aforesaid shock unit through the aforesaid control unit by using microphone and camera built in the aforesaid portable terminal; and communication unit to be electrically connected to the aforesaid shock unit, control unit, power supply unit, and portable terminal, transmitting the current position of the portable terminal to a particular organization along with sound and image collected by the aforesaid multimedia unit during the operation of the shock unit.

In this case, the aforesaid shock unit is characterized in that it comprises: multiple shock bars that are mounted on one side of the aforesaid case body and arranged to be elastic, being stored or projected in the longitudinal direction by the operation of the control unit; and operating assembly that is mounted on one side of the aforesaid case body, extruding or housing the aforesaid shock bar from one side of the case body by the operation of the control unit.

At this time, the aforesaid control unit is characterized in that it is the switch for maintaining or blocking an electrical connection between the power supply unit and the shock unit, or for storage or protruding of the shock bar of the shock unit from one side of the case body.

In addition, the aforesaid control unit is characterized in that it comprises: the standby mode where the shock bar protrudes from one side of the case body when the switch is operated once, the operating mode where electric energy flows to the shock bar when the switch is operated once more in the aforesaid standby mode, and the finishing mode where the electrical energy to the shock bar is blocked and the shock bar is housed in one side of the case body when the switch is operated once more in the aforesaid operating mode.

And, the aforesaid multimedia unit is characterized in that: it comprises the microphone to be mounted on the aforesaid case body and to collect sound by recording the current situation while operated in conjunction with the control unit during an emergency, and the camera to be mounted on the case body and to collect image by recording the current situation while operated in conjunction with the control unit; and the aforesaid microphone and camera transmit the aforesaid sound and image to the communicator of the aforesaid portable terminal in conjunction with the communication unit.

And, the aforesaid communication unit is characterized in that: it comprises Bluetooth module that is mounted on the aforesaid case body and electrically connected to the Bluetooth network built in the portable terminal and to the shock unit, transmitting the usage information of the shock unit to the portable terminal through Bluetooth network when the shock unit is detected to operate in synchronization with the Bluetooth network, and collecting the aforesaid sound or image by activating the multimedia unit when the usage information is received; and the aforesaid Bluetooth module transmits the sound or image collected by the aforesaid multimedia unit to the communicator of the aforesaid portable terminal that transmits the aforesaid sound or image to a certain organization or to pre-entered specific contact.

In addition, the aforesaid case body is characterized in that it comprises: cover to be extended from one side of the aforesaid case body; silver nano-shielding layer to be coated on the surface of the aforesaid case body, facing the display panel of the portable terminal; the on-off switch to be mounted to one side of the aforesaid case body and to be connected to the aforesaid power supply unit; and LED Light to be mounted on one side of the aforesaid case body and to be lit by the aforesaid control unit.

In addition, the case of personal terminal device with electric shocking function and finger scan is characterized in that it comprises the fingerprint identification unit that is electrically connected to the aforesaid control unit and operates the aforesaid control unit when the fingerprint information initially entered and saved by the owner of the case body matches current fingerprint information in contact with the case body.

Beneficial Effects

The effects that the present invention is expected to produce are as follows:

First, the present invention enables an active protection and defense of the portable terminal holder against treats in case of emergency as well as original function of the case to protect the portable terminal from an external impact, by allowing the shock unit, receiving power from the power supply unit, to be operated by the control unit and by allowing operating conditions to be transmitted to a certain organization via communication unit.

In particular, the present invention permits the portable terminal holder to be able to respond positively to some extent to the spaced threat, by allowing the shock unit to be projected by a predetermined length from one side of the case body through the control unit.

DETAILED DESCRIPTION OF THE PREFERRED EMBODIMENTS

Figure 1:
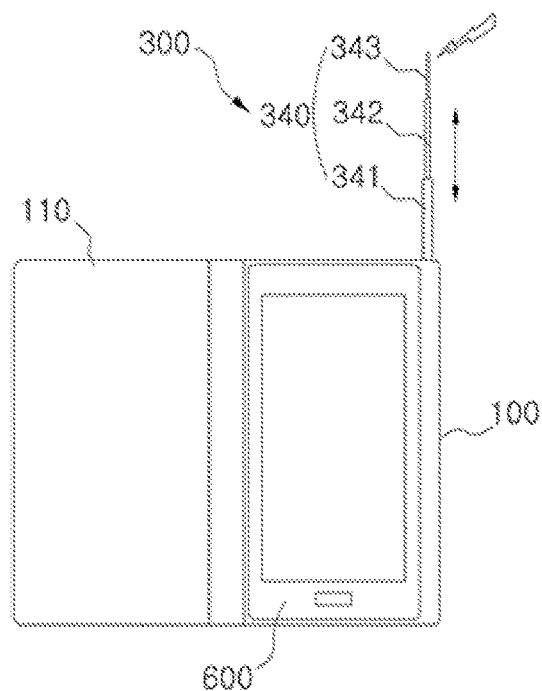
FIG. 1 is a conceptual diagram seen from the front, showing the body of the case of personal terminal device with electric shocking function and finger scan, according to an embodiment of the present invention.

Best Mode for Carrying Out the Invention

The benefits and characteristics of the present invention and the methods to implement it can be clarified with reference to the embodiments to be described below in detail along with attached drawings.

However, the present invention will not be limited to the embodiments set forth herein but may be embodied in many different forms.

Rather, the embodiments introduced here are provided to make this disclosure thorough and complete and to transmit the concept of this invention to those skilled in the art.

In the drawings, the thicknesses of layers and regions are exaggerated for clarity.

The terms such as top, bottom, upper surface, lower surface, or upper part, lower part, etc. are used to distinguish between the relative positions in the components.

For example, when the upper part and lower part of drawing is named the top and the bottom respectively for convenience, the top can be named the bottom and the bottom can be named the top in practice as far as it does not exceed the scope of the present invention.

The terms used in this application are used for the purpose of describing particular embodiments only and are not intended to limit the present invention.

The singular expression, unless it has a clearly different meaning in the context, includes a plural meaning.

In this application, the terms, such as "include" or "have", are intended to designate the presence of characteristics, numbers, steps, operations, elements, parts or combinations thereof, and not to be understood to preclude the presence or the possibility of addition of characteristics, numbers, steps, operations, elements, parts or combinations thereof.

Unless otherwise defined, all terms used herein, including technical and scientific terms, may be used as a means that can be understood in common by those of ordinary skill in the art.

General terms that are defined in dictionary shall be construed to have the same meanings in the context of the relevant art, unless otherwise defined explicitly in this application, and not be interpreted to have an idealistic or excessively formalistic meaning.

Hereinafter, preferred embodiments of the present invention shall be described with reference to the accompanying drawings.

Figure 2A:
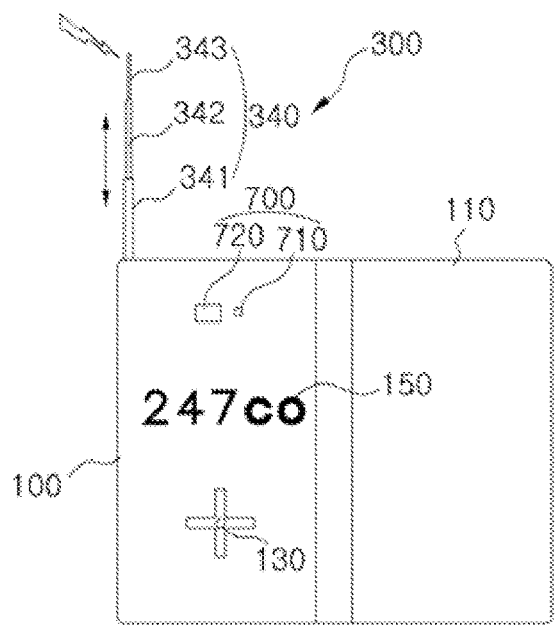
FIGS. 2A and 2B are conceptual diagrams seen from the back and side, respectively, showing the body of the case of personal terminal device with electric shocking function and finger scan, according to an embodiment of the present invention.
Figure 2B:
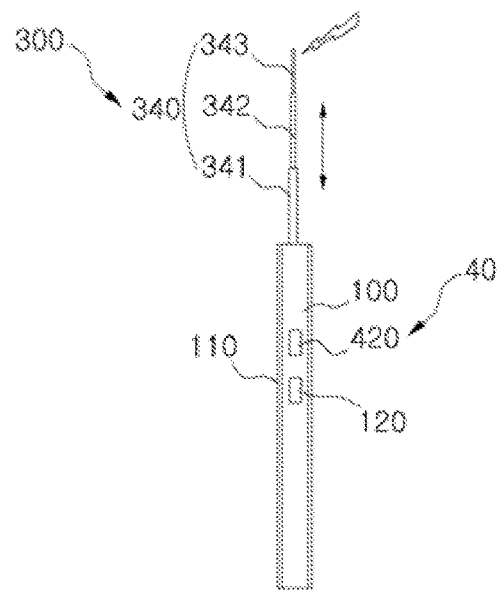
Figure 3:
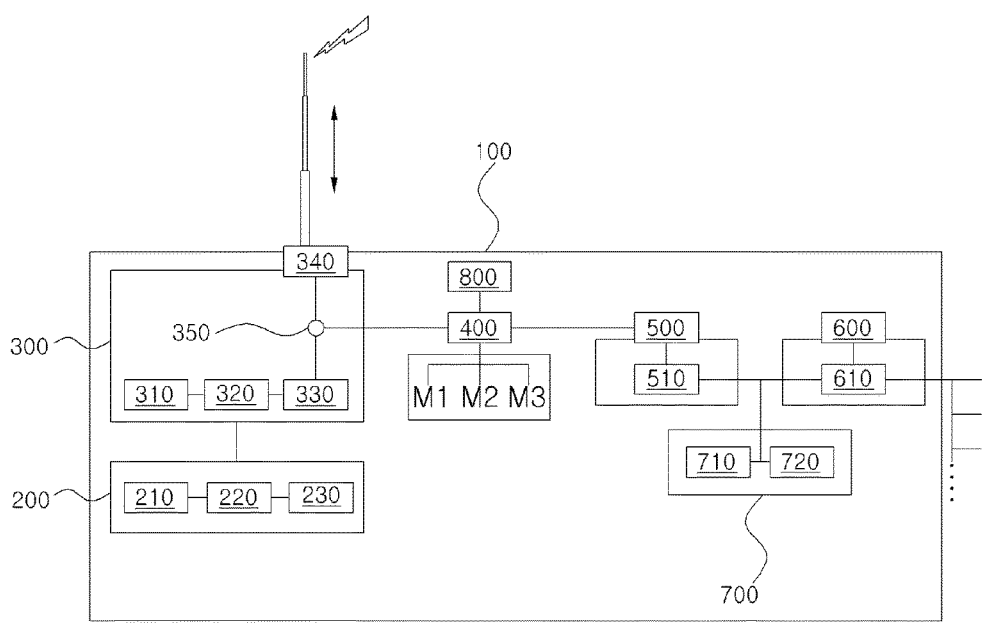
FIG. 3 is a block diagram, showing the electrical wiring and bonding relationship of the case of personal terminal device with electric shocking function and finger scan, according to an embodiment of the present invention.

FIG. 1 is a conceptual diagram seen from the front, showing the body of the case of personal terminal device with electric shocking function and finger scan, according to an embodiment of the present invention, and FIGS. 2A and 2B are conceptual diagrams seen from the back and side, respectively, showing the body of the case of personal terminal device with electric shocking function and finger scan, according to an embodiment of the present invention, while FIG. 3 is a block diagram, showing the electrical wiring and bonding relationship of the case of personal terminal device with electric shocking function and finger scan, according to an embodiment of the present invention.

The present invention can be determined as illustrated to be a structure including the case body (100), the shock unit (300), the control unit (400), the multimedia unit (700), and the communication unit (500).

The case body (100) is to accommodate the body of portable terminal (600) such as cellular phone or smart phone, serving as a general shock protection case.

In this case, although the case body (100) is not particularly illustrated, it may correspond to the portable terminal (600) with a variety of sizes and widths by applying the sliding detachable structure where the length is variable in the longitudinal or lateral direction.

The shock unit (300) is mounted to be projected or accommodated on one side of the case body (100) in order to generate high current by amplifying the electric energy supplied from the power supply unit (200) attached on the case body (100).

The control unit (400) is electrically connected to the shock unit (300), the power supply unit (200), and the portable terminal (600), in order to operate the shock unit (300) in the event of emergency.

The multimedia unit (700) is mounted on one side of the case body (100) to collect the operating status of the shock unit (300) in sound or image through the control unit (400).

The communication unit (500) is electrically connected to the shock unit (300), the control unit (400), the power supply unit (200), and the portable terminal (600), in order to transmit the current position of the portable terminal (600) along with image and image collected through multimedia unit (700) during the operation of the shock unit (300).

The present invention can be applied to the embodiments described above, and of course also to the following various embodiments.

First, the case body (100) is equipped with the cover (110) extended to one side of the case body (100) as well as the part to accommodate the portable terminal (600), protecting the display panel of the portable terminal (600) from an external shock.

And, the surface of the cover (110) facing the display panel of the portable terminal (600) is coated with silver nano-shielding layer (not shown hereafter) to block the electromagnetic waves and probably to inhibit bacterial growth on the surface of the portable terminal (600).

Then, the case body (100) further includes an on-off switch (120) mounted on one side of the case body (100) and connected to the power supply unit (200) as shown in FIG. 2B to block or supply the power to the entire apparatus.

And, the case body (100) further includes the LED Light (130) mounted on one side of the case body (100) and lit by the control unit (400) as shown in FIG. 2A, enabling the performance of the original function of searchlight as well as clear shooting of the current situation in the event of emergency in the dark or at night.

And, the case body (100) may be printed with company name, promotional text, or logo (150) on it the as shown in FIG. 2A for corporate promotion or publicity.

In addition, the case body (100) can, although not illustrated, be further equipped with charging terminal connected to the power supply unit (200), which can be coupled to or removed from the power supply adapter cable or USB cable.

On the other hand, the power supply unit (200) mounted on the case body (100) is electrically connected to the portable terminal (600) in order to supply power for the operation of the shock unit (300) that will be described later, applying in many the embodiments including the auxiliary battery (210), the rectifier circuit (220), and the charge-discharge circuit (230).

In other words, the auxiliary battery (210) that is mounted on one side of the case body (100) is utilized as the auxiliary power of the portable terminal (600) during normal operation and can be utilized as the available power to shock unit (300) in case of emergency.

The rectifier circuit (220) is connected to the auxiliary battery (210) to supply a constant current to the shock unit (300) and the portable terminal (600).

The charge-discharge circuit (240) is connected to the auxiliary battery (210) to perform charging and discharging of the auxiliary battery (210).

Meanwhile, the shock unit (300) is to apply an electric shock to the threatening people, by generating a high current as described above, and it has a structure including the oscillation circuit (310), the high voltage transformer (320), and the voltage doubler rectifier circuit (330).

The oscillation circuit (310) is mounted on one side of the case body (100) and electrically connected to the power supply unit (200) and the control unit (400) to oscillate at a certain frequency the power supplied from the power supply unit (200).

The high voltage transformer (320) is electrically connected to the oscillation circuit (310) to step-up the current supplied from the power supply unit (200).

The voltage doubler rectifier circuit (330) is electrically connected to the high voltage transformer (320) to maintain a constant step-up current during the operation time of the control unit (400).

This maintaining of stepped-up current for a period of time through the voltage doubler rectifier circuit (330) is made by the control unit (400) to be described later.

In addition, the shock unit (300) is applicable to the embodiment comprising the shock bar (340) and the operating assembly (350) for the mechanical action to be housed or protrude from one side of the case body (100).

The shock bar (340) is made up of a plurality of unit bars (341, 342, 343) that are mounted on one side of the case body (100) and arranged to be elastic through the storage or projection in the longitudinal direction by the operation of the control unit (400).

The operating assembly (350) is mounted on one side of the case body (100), and extrudes or accommodates the shock bar (340) to one side of the case body (100) by the operation of the control unit (400).

The operating assembly (350) comprises, although not particularly illustrated, a steel wire that is wound up and released like a spring to extrude and accommodate a plurality of unit bars (341, 342, 343) in the longitudinal direction, a combination of motors enabling forward and reverse rotation, a rack built in a plurality of unit bars (341, 342, 343), and a combination of pinions coupled to the drive shaft end of the motor, allowing various applications and modifications of design.

On the other hand, the control unit (400) is the switch (420) to maintain or cut the electrical connection between the power supply unit (200) and the shock unit (300), or to extrude or accommodate the shock bar (340) of the shock unit (300) to one side of the case body (100).

The control unit (400) including this switch (420) can operate the shock unit (300) in several modes, such as the standby mode (M1), the operating mode (M2), and the finishing mode (M3).

If the switch (420) is operated once in the standby mode (M1), the shock bar (340) carries out an operation to be projected from one side of the case body (100).

If the switch (420) is operated one more in the operating mode (M2), electric energy flows to the shock bar (340).

In the finishing mode (M3), if the switch (420) is operated once more in the operating mode (M2), the switch blocks the electric energy of the shock bar (340) and performs the operation to accommodate the shock bar (340) on one side of the case body (100).

On the other hand, the multimedia unit (700) is, as described above, to collect sound and image, and has a structure including the microphone (710) and the camera (720).

The microphone (710) is mounted on the case body (100) to record the current situation and to collect sound in conjunction with the control unit (400) in case of emergency.

The camera (720) is mounted on the case body (100) to shoot the current situation and collect image in conjunction with the control unit (400) in case of emergency.

Thus, the microphone (710) and the camera (720) transmit sound and image to the communicator (610) of the portable terminal (600) in conjunction with the communication unit (500) to be described later.

Here, the multimedia unit (700), in some cases, can omit the microphone (710) and the camera (720) mounted on the case body (100), and use the microphone and camera basically built-in the portable terminal (600) such as smartphone and tablet PC.

On the other hand, the communication unit (500) is, as described above, to carry out the communication operation with the portable terminal (600) and includes the Bluetooth module (510).

The Bluetooth module (510) is mounted on the case body (100) and electrically connected to the Bluetooth network and the shock unit (300) that are built in the portable terminal (600), and when detecting the operation of the shock unit (300) through the synchronization with Bluetooth network, it transmits the usage information of the shock unit (300) to the portable terminal (600) via Bluetooth network and collects sound or image by operating the multimedia unit (700) when receiving the usage information.

Accordingly, the Bluetooth module (510) will be able to transmit the sound or image collected by the multimedia unit (700) to the communicator (610) of the portable terminal (600) that transmits the aforesaid sound or image to a certain organization or pre-entered contact.

That is, the communicator (610) may be provided in the form of a dedicated application that can be installed in portable terminals that are recently widely used such as smartphone and table PC.

Specifically, the communicator (610), as a dedicated form to be installed in the portable terminal (600), operates the microphone (710) and the camera (720) of the multimedia unit (700), and can perform a function to transmit recorded audio and image along with SMS to specific organs such as police station, fire station, or private warning agency, etc.

In addition, the communicator (610) can also transmit the sound or image collected by operating the microphone or camera of the portable terminal (600) along with SMS to specific organs such as police station, fire station, or private warning agency, etc.

On the other hand, it is preferable to further include a fingerprint identification unit (800) in order to prevent incorrect operation of a child or manipulation by any third party with ulterior motive.

The fingerprint identification unit (800) is electrically connected to the control unit (400), and may be used as a safety device that prevents the operation of the control unit (400) through the comparison with the fingerprint data initially set by the owner of the case body (100) when a child or a third party with ulterior motive tries to manipulate the control unit.

Therefore, the fingerprint identification unit (800) will be able to reliably protect the safety of the owner by operating the control unit (400) only with the contact with the owner's fingerprint.

As mentioned above, the present invention is based on the basic technical idea to provide the case of personal terminal device with electric shocking function and finger scan that can actively protect and defend the portable terminal holder against treats in case of emergency as well as perform the original function of the case to protect the portable terminal from an external impact.

Of course, within the scope of the basic technical concept of the present invention, many other modifications and applications are also possible for those of ordinary knowledge in the art.

DESCRIPTION OF SIGNS

100 . . . Case body
110 . . . Cover
120 . . . On-off switch
130 . . . LED Light
150 . . . Logo
200 . . . Power supply unit
210 . . . Auxiliary battery
220 . . . Rectifier circuit
230 . . . Charge-discharge circuit
300 . . . Shock unit
310 . . . Oscillation circuit
320 . . . High voltage transformer
330 . . . Voltage doubler rectifier circuit
340 . . . Shock bar
341, 342, 343 . . . Unit bar
350 . . . Operating assembly
400 . . . Control unit
420 . . . Switch
500 . . . Communication unit
510 . . . Bluetooth module
600 . . . Portable terminal
610 . . . Communicator
700 . . . Multimedia unit
710 . . . Microphone
720 . . . Camera
800 . . . Fingerprint identification unit
M1 . . . Standby mode
M2 . . . Operating mode
M3 . . . Finishing mode

What is claimed is:

1. A protective case with electric shocking function and finger scan for a portable terminal device, the protective case being detachably connecting to the portable terminal device and in communication with the portable terminal device including a communicator provided in a form of a dedicated application installed therewithin, the protective case comprising:

a case body, accommodating a body of the portable terminal device with a variety of sizes and widths by applying a sliding detachable structure where a length is variable in a longitudinal or lateral direction;

a shock unit, mounted to be accommodated and projected on the case body and generating high current by amplifying electric energy supplied from a power supply unit mounted on the case body;

a control unit, electrically connected to the shock unit, and operating the shock unit in case of emergency;

a multimedia unit, mounted on the case body to be operated by the communicator of the portable terminal device to collect operating conditions of the shock unit in sound or image;

a communication unit, electrically connected to the control unit, the communication unit carrying out communication operations with the portable terminal device, and the communication unit further transmitting the sound or image collected by the multimedia unit to the communicator of the portable terminal device in order to transmit a current position of the portable terminal device to specific organizations along with the sound or image collected in the multimedia unit during an operation of the shock unit; and a fingerprint identification unit, electrically connecting to the control unit, to operate the control unit when fingerprint information initially entered and saved by an owner of the case body matches current fingerprint information in contact with the case body;

wherein the shock unit further comprises:

a shock bar, mounted on the case body and made up of a plurality of unit bars to be arranged to be elastic in a longitudinal direction to be accommodated or projected, and an operating assembly, mounted on the case body to make the shock bar protrude or accommodate the shock bar from one side of the case body by an operation of the control unit;

wherein the operating assembly comprises a steel wire and a combination of motors, the steel wire is wound up and released to extrude and accommodate the unit bars in the longitudinal direction, and the combination of the motors enables forward and reverse rotation of the steel wire, and wherein the control unit includes a switch to control the operating assembly to accommodate the shock bar of the shock unit or make the shock bar of the shock unit protrude from one side of the case body.

2. The protective case of claim 1, wherein the switch maintains or cuts the electrical connection between the power supply unit and the shock unit.

3. The protective case of claim 2, wherein the control unit further comprises:

a standby mode, wherein the shock bar protrudes from the one side of the case body when the switch is operated once, an operating mode, wherein electric energy flows to the shock bar when the switch is operated once more in the standby mode, and a finishing mode, wherein the electrical energy to the shock bar is blocked and the shock bar is housed in the one side of the case body when the switch is operated once more in the operating mode.

4. The protective case of claim 1, wherein the multimedia unit further comprises:

a microphone, mounted on the case body to record and collect a current situation in sound through an operation in conjunction with the control unit in case of emergency and a camera, mounted on the case body to record and collect the current situation in image through an operation in conjunction with the control unit in case of emergency, and wherein the microphone and camera transmit the sound and image to the communicator of the portable terminal device in conjunction with the communication unit.

5. The protective case of claim 1, wherein the communication unit further comprises:

a Bluetooth module, mounted on the case body in order to be electrically connected to a Bluetooth network and the shock unit built in the portable terminal device, transmitting usage information of the shock unit to the portable terminal device through the Bluetooth network when the operation of the shock unit is detected in synchronization with the Bluetooth network, collecting sound or image through an operation of the multimedia unit when the usage information is received, and transmitting the collected sound or image by the multimedia unit to the communicator of the portable terminal device for transmission to specific organizations or pre-entered specific contacts.

6. The protective case of claim 1, wherein the case body further comprises:

a cover, extended from one side of the case body;

a silver nano-shielding layer, applied on a surface of the cover facing a display panel of the portable terminal device;

an on-off switch, mounted on the case body for a connection to the power supply unit; and a light-emitting diode light, mounted on the case body and lit by the control unit.

* * * * *